April 7, 1970
R. D. WHEELER
3,505,578
"ON-OFF" MOTOR CONTROL FOR USE IN A RADAR SYSTEM
Filed March 27, 1968
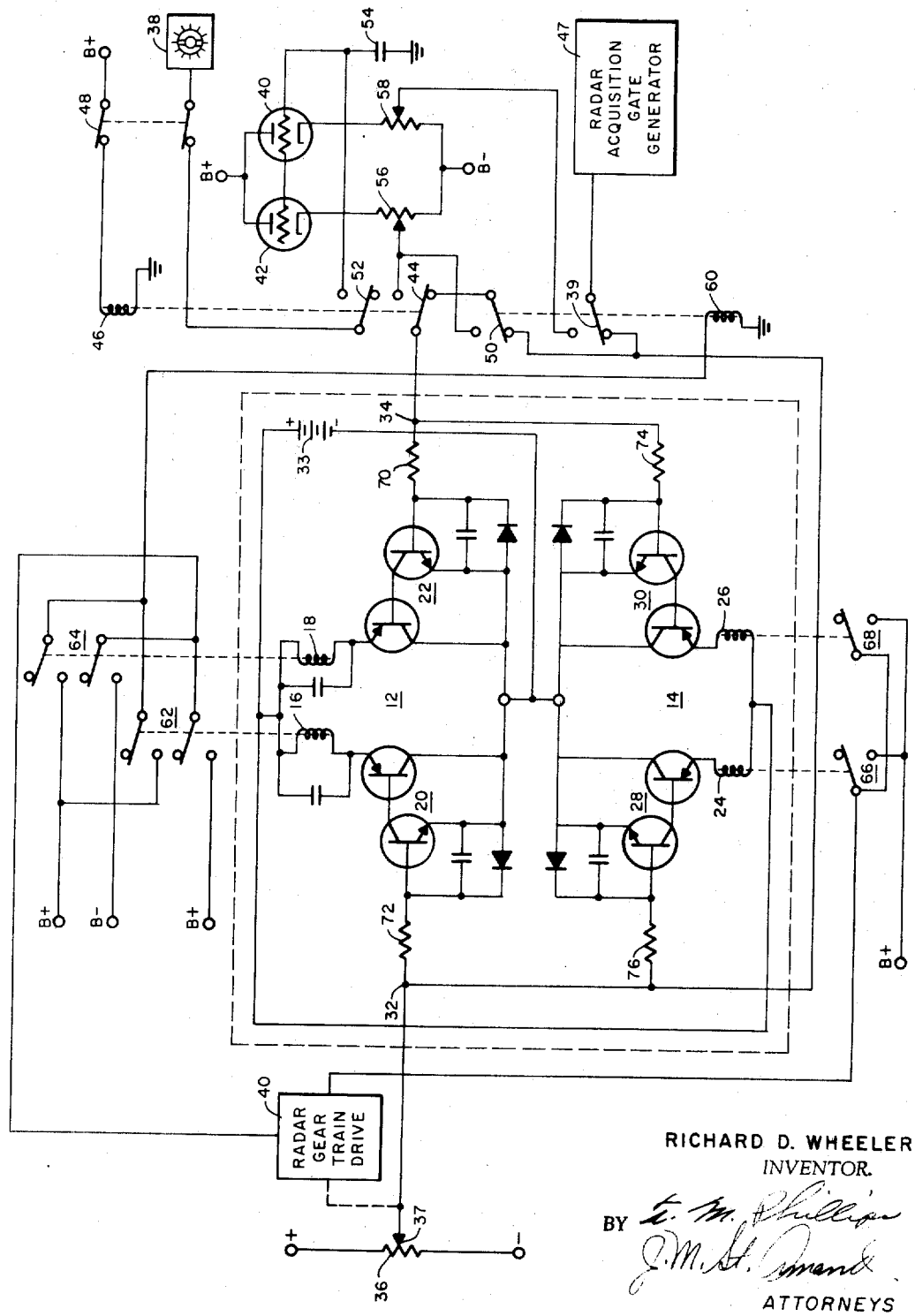
RICHARD D. WHEELER
*INVENTOR.*
BY
ATTORNEYS

United States Patent Office 3,505,578
Patented Apr. 7, 1970

3,505,578
"ON-OFF" MOTOR CONTROL FOR USE IN A
RADAR SYSTEM
Richard D. Wheeler, Norco, Calif., assignor to the United
States of America as represented by the Secretary of
the Navy
Filed Mar. 27, 1968, Ser. No. 716,473
Int. Cl. G05b 11/01
U.S. Cl. 318—18                                    5 Claims

ABSTRACT OF THE DISCLOSURE

A comparator circuit for providing slew, drive, and drive sense control signals to a radar gear train motor. A comparison is made of two direct current inputs by a circuit which has each input associated with only one relay and whichever input is more positive with respect to the other input causes its associated relay to be energized. Polarity sense between the two inputs is provided since only one relay can be energized. All relays are de-energized when the two inputs are equal.

The invention herein described may be manufactured and used by or for the Government of the United States of America for governmental purposes without the payment of any royalties thereon or therefor.

The present invention relates to comparator circuits and more particularly to comparator circuits for use in radar range gate acquisition. There are no known systems which will provide instantaneous acquisition gate positioning to any desired range and then quickly drive the gear train to the new position and restore all systems to normal.

SUMMARY

The present invention provides a device for instantaneous (electronic) acquisition gate positioning to any desired range and then to quickly drive the gear train to a new position and restore all systems to normal. The comparator circuit is used only when the acquisition gate is manually positioned electronically to a new position. A slew voltage is fed to the motor gear changer of the gear train driver and a drive voltage of the correct sense to the gear train motor to reposition the gear train to the manual acquistition gate position. The comparator automatically de-energizes and returns all system elements to normal when the two positions become the same.

Many of the attendant advantages of the invention will become readily appreciated as the same becomes better understood by reference to the following detailed description when considered in connection with the accompanying drawing wherein there is shown in the single figure a schematic diagram of a preferred embodiment.

Referring now to the drawing there is shown a comparator 10 having two comparator circuits 12 and 14. Comparator circuit 12 is a bridge circuit arrangement having relay coils 16 and 18 forming two adjacent arms with transistor amplifiers 20 and 22 forming the other two arms. Comparator circuit 14 is a bridge circuit having relay coils 24 and 26 for two adjacent arms with transistor amplifiers 28 and 30 forming the other two arms. Comparator circuits 12 and 14 are connected in parallel with power being supplied from a floating power supply 33 and having two inputs applied at points 32 and 34. The input applied at point 32 is a voltage picked off from potentiometer 36 by movable contact 37 which is driven by the radar gear train drive 40.

The input applied at point 34 is a voltage supplied from a manual selector 38 through cathode followers 40 and 42 and relay switch 44 when relay coil 46 is energized by means of switch 48.

In operation the acquisition gate control voltage is taken from arm 37 of motor driven potentiometer 36 and fed through switch 39 to the radar gate acquistion generator 47 which supplies gate voltages to various equipments (not shown). When in the positions shown, point 32 is connected to point 34 by means of switches 50 and 44 and no action occurs. When switch 48 is closed, relay coil 46 is energized and the manual position voltage at control box 38 is fed to the grids of cathode followers 40 and 42 via relay switch 52. Capacitor 54 stores the voltage representing the selected gate position and holds the cathodes of tubes 40 and 42 at a constant level. Whenever the voltages at 56 and 58 (representing the new position) are different from the initial voltage at point 32, either coil 16 or 18 will energize and B+ voltage will in turn energize coil 60. Relay coil 46 need not be energized continuously for the comparator to operate since with relay coil 60 energized a circuit exists through relay switch 50. Once relay coils 46 and 60 are energized the acquisition gate will be electronically positioned to any desired range by varying the voltage control 38. Depending on whether relay 62 is energized by coil 16 or relay 64 is energized by coil 18, B+ voltage will be fed to radar gear train drive 40 until comparator 10 is re-balanced. The less sensitive comparator circuit 14 will close either of relays 66 or 68 if the voltage difference between poinnts 32 and 34 indicates a range greater than 5000 yards, and provides a slew voltage to gear train drive 40. As movable contact 37 moves with gear train 40, the changing voltage at point 32 is compared with the constant voltage at point 34 and when they are equal, relays 62 and 64 are de-energized returning the system to normal.

Threshold resistors 70 and 72 should be chosen such that a sensitivity relay 64 is energized whenever the voltage at point 34 is greater than the voltage at point 32 and relay 62 should energize when the voltage at point 34 is less than the voltage at point 32. Threshold resistors 74 and 76 should be chosen to allow slew relay 66 or 68 to de-energize whenever the difference between the voltages at points 32 and 34 represent a range of about 5000 yards.

Obviously many modifications and variations of the present invention are possible in the light of the above teachings. It is therefore to be understood that within the scope of the appended claims the invention may be practiced otherwise than as specifically described.

What is claimed is:
1. In a comparator for use in radar range gate acquisition, the combination comprising:
 (a) a radar gear train drive,
 (b) a potentiometer having a movable arm coupled to said radar gear train drive for providing a voltage representing the position of the radar acquisition gate,
 (c) a radar acquisition gate generator,
 (d) switch means having first and second positions for coupling the voltage of the movable arm of said potentiometer to said radar acquisition gate generator when in the first position,
 (e) manual acquisition gate control means having an output voltage proportional to the range of the target to be acquired,
 (f) comparator circuit means having a first input coupled to the movable arm of said potentiometer and a second input coupled to the output of said manual acquisition gate control means,
 (g) relay means responsive to an unbalanced condition of said comparator circuit means when the output voltage of said manual acquisition gate control means is different from the voltage of said movable arm for connecting a drive voltage of the proper sense and magnitude to said radar gear train drive to reposition said movable arm to provide a volt- age input to said comparator equal to the manually supplied voltage input.

2. The comparator of claim 1 wherein said comparator circuit means includes a first circuit responsive to any difference of voltage inputs to reposition the movable arm of said potentiometer and a second circuit responsive only to difference in voltage inputs above a predetermined value to rapidly reposition the movable arm of said potentiometer.

3. The comparator of claim 1 wherein said radar acquisition gate generator is coupled to said manual acquisition gate control means when said switch means is in its second position.

4. The comparator of claim 1 wherein a means for coupling the output voltage of said manual acquisition gate control means to said comparator circuit means and to said radar acquisition gate generator includes a cathode follower circuit with a storage capacitor connected to the grid for holding the cathodes at a constant level.

5. The comparator of claim 2 wherein said first and second circuit means comprises two balanced bridge circuits having relay windings in adjacent arms of the bridge and being energized by a floating supply voltage.

References Cited

UNITED STATES PATENTS 2,534,801 12/1950 Siltamki.
2,890,392 6/1959 Bruck et al.
2,914,717 11/1959 Redding.

THOMAS E. LYNCH, Primary Examiner

U.S. Cl. X.R.

343—7.3, 7.4